(12) United States Patent
Oike et al.

(10) Patent No.: US 6,618,100 B2
(45) Date of Patent: *Sep. 9, 2003

(54) LIQUID CRYSTAL DEVICE, LIQUID CRYSTAL DEVICE MANUFACTURING METHOD AND ELECTRONIC APPARATUS

(75) Inventors: Kazuo Oike, Suwa (JP); Yoshio Yamaguchi, Matsumoto (JP); Naoki Makino, Matsumoto (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,039

(22) PCT Filed: Jul. 17, 1998

(86) PCT No.: PCT/JP98/03244
§ 371 (c)(1),
(2), (4) Date: Mar. 18, 1999

(87) PCT Pub. No.: WO99/05565
PCT Pub. Date: Feb. 4, 1999

(65) Prior Publication Data
US 2002/0080296 A1 Jun. 27, 2002

(30) Foreign Application Priority Data
Jul. 23, 1997 (JP) .............................. 9-197395
Nov. 5, 1997 (JP) ............................. 9-303205

(51) Int. Cl.[7] .............................................. G02F 1/136
(52) U.S. Cl. .............................. 349/42; 349/44; 349/51
(58) Field of Search .......................... 349/51, 110, 111, 349/52, 40, 42, 43, 44, 38, 39

(56) References Cited

U.S. PATENT DOCUMENTS

| | | | | |
|---|---|---|---|---|
| 5,117,299 A | * | 5/1992 | Kondo et al. | 349/52 |
| 5,227,901 A | * | 7/1993 | Iizuka et al. | 349/40 |
| 5,414,547 A | * | 5/1995 | Matsuo et al. | 349/44 |
| 5,596,432 A | * | 1/1997 | Sekiguchi | 349/51 |
| 5,745,195 A | * | 4/1998 | Zhang | 349/39 |
| 5,777,701 A | * | 7/1998 | Zhang | 349/44 |
| 5,835,169 A | * | 11/1998 | Kwon et al. | 349/38 |
| 5,893,621 A | * | 4/1999 | Sekiguchi | 349/51 |
| 5,966,193 A | * | 10/1999 | Zhang et al. | 349/110 |
| 6,128,050 A | * | 10/2000 | Sekiguchi | 349/40 |
| 6,211,928 B1 | * | 4/2001 | Oh et al. | 349/43 |

FOREIGN PATENT DOCUMENTS

| | | |
|---|---|---|
| EP | 0348209 B1 | 8/1994 |
| JP | 57-184976 | 11/1982 |
| JP | A-3-101714 | 4/1991 |
| JP | A-6-160878 | 6/1994 |

* cited by examiner

*Primary Examiner*—Toan Ton
*Assistant Examiner*—David Chung
(74) *Attorney, Agent, or Firm*—Oliff & Berridge, PLC.

(57) ABSTRACT

A liquid crystal device comprises a plurality of pixel electrodes (6), and nonlinear elements (11) including element-side electrodes (14) electrically connected to the pixel electrodes (6). An element-side electrode (14) is shaped in a pattern (14a) formed along the edge of a pixel electrode (6). The presence of the element-side electrode pattern (14a) makes it possible to prevent etchant from entering between said pixel electrode (6) and the element-side electrode (14) and causing a wire break therebetween in patterning the pixel electrode (6). When the element-side electrode pattern (14a) is made of a substance having a higher light-shielding ability than that of the pixel electrode (6), it may be used as a mark for adjusting position in bonding an element substrate and an opposite substrate.

16 Claims, 16 Drawing Sheets

LIQUID CRYSTAL DEVICE, LIQUID CRYSTAL DEVICE MANUFACTURING METHOD AND ELECTRONIC APPARATUS

FIELD OF THE INVENTION

The present invention relates to a liquid crystal device that displays visible images, such as letters and numbers, by controlling the alignment of liquid crystal to modulate light. The present invention also relates to an electronic apparatus including the liquid crystal device. The present invention further relates to a manufacturing method of manufacturing such a liquid crystal device.

DESCRIPTION OF RELATED ART (1) In recent years, a liquid crystal device has found use as a visible image display part in various types of electronic apparatuses, such as a car navigation system, and a portable electronic terminal. In a well-known type of liquid crystal device, a plurality of pairs of pixel electrodes and nonlinear elements are formed on an element substrate, opposite electrodes, and a color filter as needed, are formed on an opposite substrate, the element substrate and the opposite substrate are bonded to each other, and a cell gap formed between the substrates is sealed with liquid crystal.

Consideration will now be given to a liquid crystal device using a MIM (Metal Insulator Metal) element that is a typical example of a TFD (Thin Film Diode) element as a nonlinear element. A pattern structure including the surroundings of pixel electrodes and nonlinear elements formed on an element substrate in the liquid crystal device is conventionally formed as shown in, for example, FIG. 6. Namely, a wire line 82 and a first electrode 83 are formed on a glass substrate 81, an anodized film 84 is formed thereon, and a second electrode 86 is formed on the anodized film 84. The layered structure including the first electrode 83, the anodized film 84, and the second electrode 86 forms a MIM element 87 serving as a nonlinear element. A pixel electrode 88 is formed so as to overlap with the leading end of the second electrode 86 in the MIM element 87.

The pixel electrode 88 is generally formed by photolithography. Specifically, first, an ITO (Indium Tin Oxide) film having a uniform thickness is formed on the glass substrate 81 by sputtering or the like, and then, an unnecessary part of the ITO is removed by etching, thereby forming the pixel electrode 88 in a desired pattern. In this case, a problem is that gaps G are formed between the ITO film 88' and the second electrode 86 in forming the ITO film on the glass substrate 81 by sputtering or the like since the part of the ITO film 88' overlapping with the second electrode 86 of the MIM element does not completely adhere to the second electrode 86.

If such gaps G are produced, when etching is performed later to pattern the ITO film 88', etchant may enter the gaps G, which may cause a wire break between the second electrode 86 and the pixel electrode 88. Such a wire break can cause a dot defect in a visible image display area of the liquid crystal device. The transparent conductive film to be used as the pixel electrode may be made of SnOx, ZnOx, or the like instead of ITO. There is a fear that these film materials will insufficiently adhere to the second electrode 86. Therefore, a wire break may be caused by etching these materials.

(2) In general, the liquid crystal devices include an active-matrix liquid crystal device in that nonlinear elements are provided for respective pixels, and a passive-matrix liquid crystal device that does not use such nonlinear elements. In the active-matrix liquid crystal device, an element substrate having nonlinear elements and transparent pixel electrodes and an opposite substrate having opposite electrodes are bonded to each other, and a cell gap formed between the substrates is sealed with liquid crystal.

Element substrates and opposite substrates are not fabricated one by one, and, in general, a plurality of element substrates and opposite substrates are formed in substrate base materials having a large area, respectively. By bonding the element substrate base material and the opposite substrate base material thus fabricated, a plurality of liquid crystal panels are simultaneously formed. The element substrate base material and the opposite substrate base material are bonded such as to align alignment marks that are formed at appropriate positions thereon.

In a conventional liquid crystal device manufacturing method, in order to confirm whether the element substrate base material and the opposite substrate base material are bonded in a proper positional relationship, an image of one pixel portion in the liquid crystal panel is formed by using an image pickup device such as a CCD camera and displayed on a screen of a CRT monitor or the like, or one pixel portion is microscopically observed, whereby it is examined whether the bonded state is proper from a positional point of view.

In a conventional inspection method, for example, the peripheral line of the transparent pixel electrode on the element substrate and a predetermined reference mark on the opposite substrate side, for example, the peripheral line of an opening portion of a black matrix, are compared with each other, and it is determined whether they are in a proper positional relationship. Thereby, it is determined whether the bonded state of the element substrate and the opposite substrate is good or bad. If it is good, the device is shipped as a product. If it is bad, the device is disposed of. Since the transparent pixel electrodes formed on the element substrate side are almost colorless and transparent, however, it is very difficult to perform a precise inspection in a short time in the case of the conventional liquid crystal device that is subjected to visual inspection with reference to the transparent pixel electrodes.

SUMMARY OF THE INVENTION (3) The present invention has been made in view of the aforementioned problems, and an object of the present invention is to improve productivity of liquid crystal devices by providing an appropriate member on the periphery of a pixel electrode.

More specifically, a first object of the present invention is to provide an appropriate member on the periphery of a pixel electrode so as to prevent contact failure due to etching between a nonlinear element and the pixel electrode, and to prevent a dot defect in a visible image display area of a liquid crystal device.

A second object of the present invention is to provide an appropriate member on the periphery of a pixel electrode so as to precisely and visually detect the amount of offset between an element substrate and an opposite substrate in a short time.

(1) In order to achieve the above first object, the present invention provides a liquid crystal device having a plurality of pixel electrodes and a nonlinear element including an element-side electrode electrically connected to the pixel electrodes, wherein the element-side electrode is shaped in a pattern formed along the edge of the pixel electrode.

According to this liquid crystal device, since a part of the element-side electrode that overlaps with the pixel electrode is shaped like a pattern formed along the edge of the pixel electrode, when divided pixel electrodes are formed by etching an ITO film, etchant is prevented from entering between the element-side electrode and the ITO film. Therefore, it is possible to prevent a wire break between the element-side electrode and the ITO film.

(2) In the configuration mentioned above, it is preferable that the element-side electrode be shaped like a ring-shaped frame along the entire peripheral edge of the pixel electrode. This makes it possible to restrict the entry of etchant as much as possible, and to thereby more reliably prevent a wire break.

(3) Preferably, the outer dimensions of the element-side electrode are larger than that of the pixel electrode. This makes it possible to more reliably prevent the entry of the etchant.

(4) Next, in order to achieve the above first object, the present invention provides an electronic apparatus including a liquid crystal device having the aforementioned configuration, and a control unit for controlling the operation of the liquid crystal device. As such an electronic apparatus, for example, a car navigation system, a portable terminal apparatus, and other various electronic apparatuses are available.

(5) In order to achieve the above second object, the present invention provides a liquid crystal device having an element substrate having a nonlinear element and a transparent pixel electrode on a substrate, and an opposite substrate opposed to the device substrate, wherein the liquid crystal element comprises a mark that overlaps with at least a part of the peripheral edge of the transparent pixel electrode in a plane manner and has a higher light-shielding ability than that of the transparent pixel electrode.

According to this liquid crystal device, since the mark overlaps with at least a part of the peripheral edge of the transparent pixel electrode in a plane manner, it can be determined, by visually comparing the mark on the element substrate and a reference mark on the opposite substrate, whether or not the positional relationship between the element substrate and the opposite substrate is proper. In particular, since the mark is formed so that it has a higher light-shielding ability than that of the transparent pixel electrode, it is easy to visually recognize. Therefore, it is possible to make a precise judgement in a short time.

(6) In the liquid crystal device having the aforementioned configuration, it is preferable that the mark be formed at least at two positions at the opposite corners of the transparent pixel electrode, and that the mark have two branch portions extending in almost perpendicular directions along two sides adjoining to the corners. When the mark is formed at two positions at the opposite corners of the transparent pixel electrode, if a predetermined region on the opposite substrate opposing a transparent pixel electrode, for example, an opening portion of a black matrix is offset from the transparent pixel electrode in a vertical direction or a horizontal direction, the offset can be detected.

When the mark includes two branch portions along two sides of the transparent pixel electrode that adjoin one corner, it is possible to easily and precisely recognize the offset of the opening portion or the like from the transparent pixel electrode both in a vertical direction and a horizontal direction.

(7) The mark may be shaped like a frame formed along the entire peripheral edge of the transparent pixel electrode. This makes it possible to detect the offset with reference to the entire periphery of the transparent pixel electrode, and to thereby achieve an even easier and more precise inspection.

(8) Some liquid crystal devices have a structure in which a nonlinear element is formed on an underlayer after the underlayer is formed on a substrate. This underlayer is made of, for example, tantalum oxide (TaOX), and has the functions of improving the adhesion of the nonlinear element, and the like. If the underlayer is present under the transparent pixel electrode, however, the transparency of the pixel area is impaired. Therefore, the underlayer in the area corresponding to the transparent pixel electrode is removed in most cases. In such a case, the peripheral edge of the removed part of the underlayer may be used as a position check mark.

(9) In the liquid crystal device of the present invention, the nonlinear element may be a two-terminal type nonlinear element. This two-terminal type nonlinear element generally includes a first electrode, an insulating film laid on the first electrode, and a second electrode laid on the insulating film. When this two-terminal type nonlinear element is used, the mark may be made of the same material as that of the first electrode or the second electrode of the two-terminal type nonlinear element. In this case, since the mark can be formed by patterning simultaneously with the patterning of the first electrode or the second electrode, the working process is not complicated.

(10) In the liquid crystal device of the present invention, the nonlinear element may be a thin-film transistor element. When this thin-film transistor element is used, the mark may be made of the material of one of the films for constituting the element, the film at least having a higher light-shielding ability than that of the pixel electrode. In this case, since the mark can be formed by patterning simultaneously with the patterning of the film, the working process is not complicated.

(11) In the liquid crystal device of the present invention, the offset is detected while comparing the mark on the element substrate side and a reference mark on the opposite substrate side. In this case, various types of marks may be available as the reference mark on the opposite substrate side. For example, when a black matrix for forming divided opening portions corresponding to pixels is formed on the opposite substrate, the peripheral edges of the black matrix opening portions may be compared with the mark. When the opposite substrate has a color filter, the peripheral edges of respective color dots, which constitute the color filter, may be compared with the mark.

(12) Next, the present invention provides a liquid crystal device manufacturing method having the step of bonding an element substrate having a nonlinear element and a transparent pixel electrode thereon and an opposite substrate opposed to the element substrate to each other, the liquid crystal device manufacturing method comprises the steps of (a) forming on the element substrate a mark having a higher light-shielding ability than that of the transparent pixel electrode so as to overlap with at least a part of the peripheral edge of the transparent pixel electrode in a plane manner, and (b) confirming with reference to the mark whether the element substrate and the opposite substrate are bonded in a proper positional relationship.

According to this manufacturing method, since the mark overlaps with at least a part of the peripheral edge of the transparent pixel electrode in a plane manner, it can be determined, by visually comparing the mark on the element substrate side and a reference mark on the opposite substrate side, whether the positional relationship between the element substrate and the opposite substrate is proper. In particular, since the mark is formed as a mark having a higher light-shielding ability than that of the transparent pixel electrode, it is easy to visually recognize. Therefore, it is possible to make a precise judgement in a short time. In this manufacturing method, the peripheral edges of opening portions of a black matrix, the peripheral edges of respective color dots in a color filter, and the like are also available as the reference mark on the opposite substrate side to be compared with the mark on the element substrate side.

(13) In the aforementioned liquid crystal device manufacturing method, the positional relationship between the element substrate and the opposite substrate may be checked by forming a black matrix for forming divided opening portions corresponding to pixels on the opposite substrate, and making positional comparison between the mark and the peripheral edges of the opening portions of the black matrix.

(14) In the aforementioned liquid crystal device manufacturing method, the positional relationship between the element substrate and the opposite substrate may be checked by forming a color film including color dots of a plurality of colors on the opposite substrate, and making positional comparison between the mark and the peripheral edges of the color dots in the color filter.

DETAILED DESCRIPTION OF PREFERRED EMBODIMENTS (First Embodiment)

Figure 3:
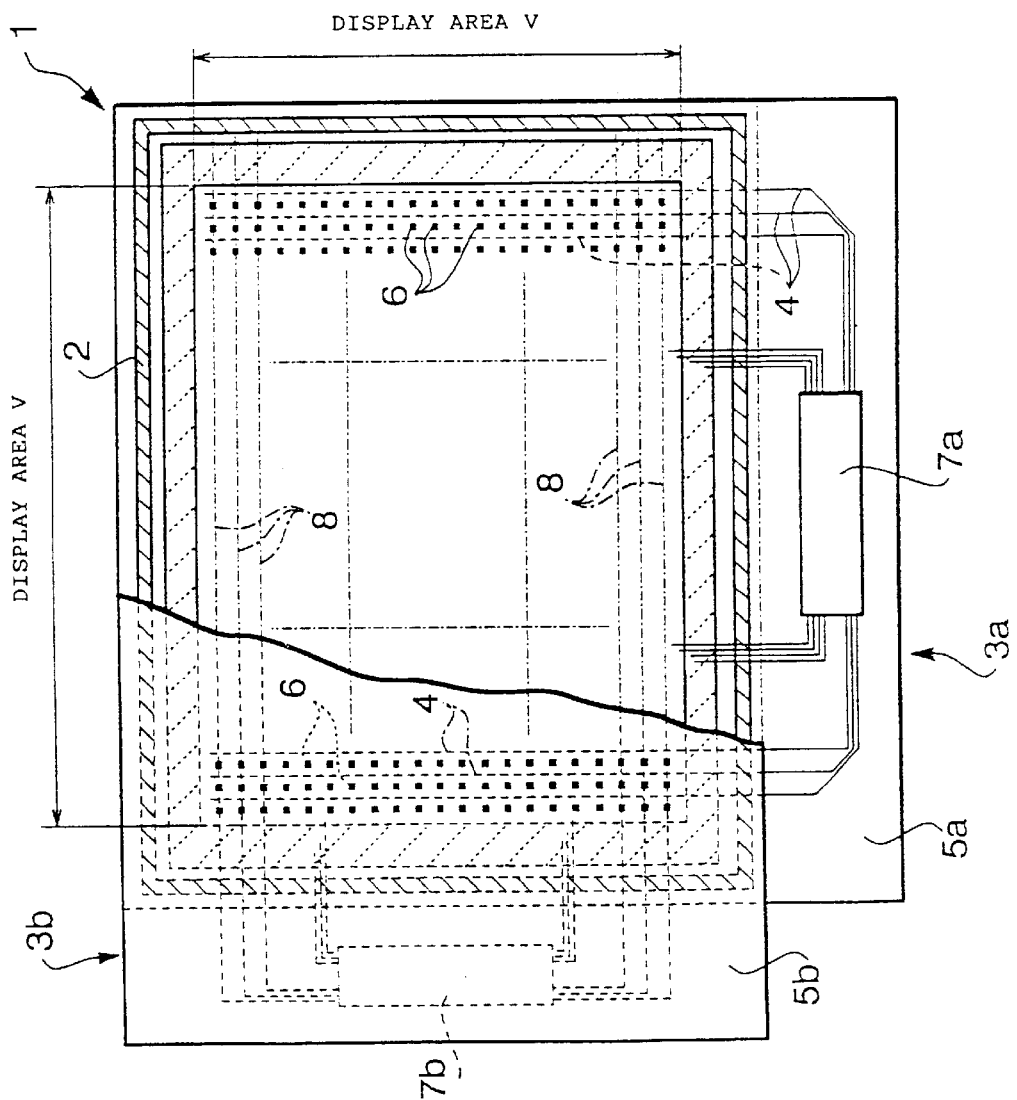
FIG. 3 is a partially cutaway plan view showing an embodiment of the liquid crystal device according to the present invention.

FIG. 3 is a partially cutaway plan view of an embodiment of a liquid crystal device according to claim 1 of the present invention. This liquid crystal device 1 has a pair of substrates bonded to each other by a sealing member 2 that is shaped like a rectangular ring by printing or the like, namely, an element substrate 3a and an opposite substrate 3b.

The element substrate 3a has a transmissive substrate 5a made of, for example, glass. On the surface of the transmissive substrate 5a, a plurality of line wires 4 and a plurality of transparent pixel electrodes 6 are formed. These line wires 4 are linearly shaped, and adjoining line wires 4 are arranged in parallel with each other. The respective pixel electrodes 6 are arranged in a line between the line wires 4, and arranged in a matrix as a whole. The respective line wires 4 are electrically connected to output terminals of a liquid crystal driving IC 7a that is mounted on an extended portion of the transmissive substrate 5a.

The opposite substrate 3b opposed to the element substrate 3a has a transmissive substrate 5b made of, for example, glass. On the surface of the transmissive substrate 5b, a plurality of transparent opposite electrodes 8 are formed. These opposite electrodes 8 are linearly shaped, and adjoining opposite electrodes 8 are arranged in parallel. These opposite electrodes 8 are electrically connected to output terminals of a liquid crystal driving IC 7b that is mounted on an extended portion of the transmissive substrate 5b.

Figure 1:
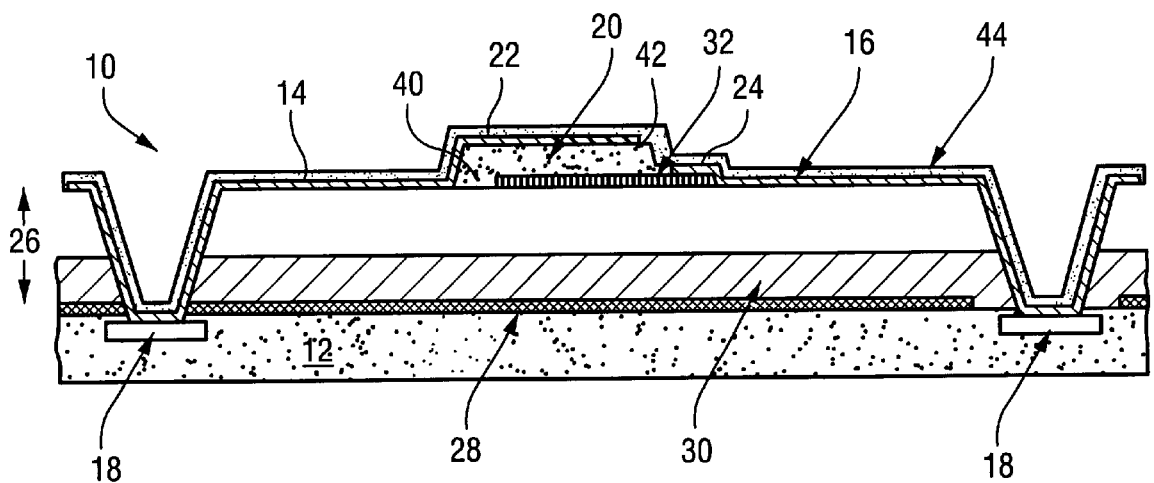
FIG. 1 is a plan view showing the principal part of an embodiment of a liquid crystal device according to the present invention, in particular, the surroundings of a pixel electrode and a MIM element.

Between the line wire 4 and the pixel electrode 6, a MIM element 11 is formed as a nonlinear element, as shown in FIG. 1. The MIM element 11 is composed of a first electrode 12 projecting from the line wire 4, an anodized film 13 formed on the first electrode 12 by anodizing, and a second electrode 14 formed on the anodized film 13.

Figure 2:
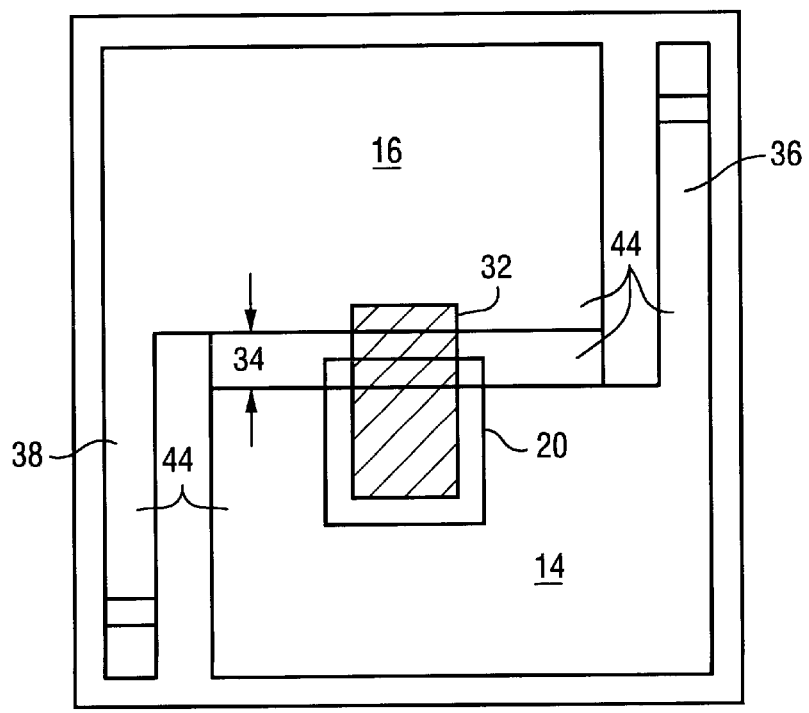
FIG. 2 is a side sectional view taken along line X—X in FIG. 1.

A leading end 14a of the second electrode 14 is shaped like an annular frame along the entire periphery of the pixel electrode 6. As shown in FIG. 2, the pixel electrode 6 is overlaid on the electrode leading end 14a. In this embodiment, the external dimensions S of the frame-like leading end 14a of the second electrode 14 are set equal to those of the pixel electrode 6.

The pixel electrode 6 is formed by using a known photolithography process after the second electrode 14 of the MIM element 11 is formed in a predetermined shape on the transmissive substrate 5*a* that constitutes the element substrate 3*a*. Specifically, an ITO film having a uniform thickness is formed on the entire transmissive substrate 5*a* by sputtering, and an unnecessary part of the ITO film is removed by etching, whereby the pixel electrode 6 is shaped like a rectangle that fits the frame shape of the leading end 14*a* of the second electrode 14.

In etching the ITO film, etchant may enter the outside of the frame-like leading end 14*a* of the second electrode 14, whereas it does not enter the inner region of the leading end 14*a* that is closed due to its frame shape. Therefore, the etchant does not enter between the electrode leading end 14*a* and the pixel electrode 6, and wire breaks are thereby avoided. As a result, it is possible to manufacture a normal liquid crystal device having no dot defect.

(Second Embodiment)

Figure 5:
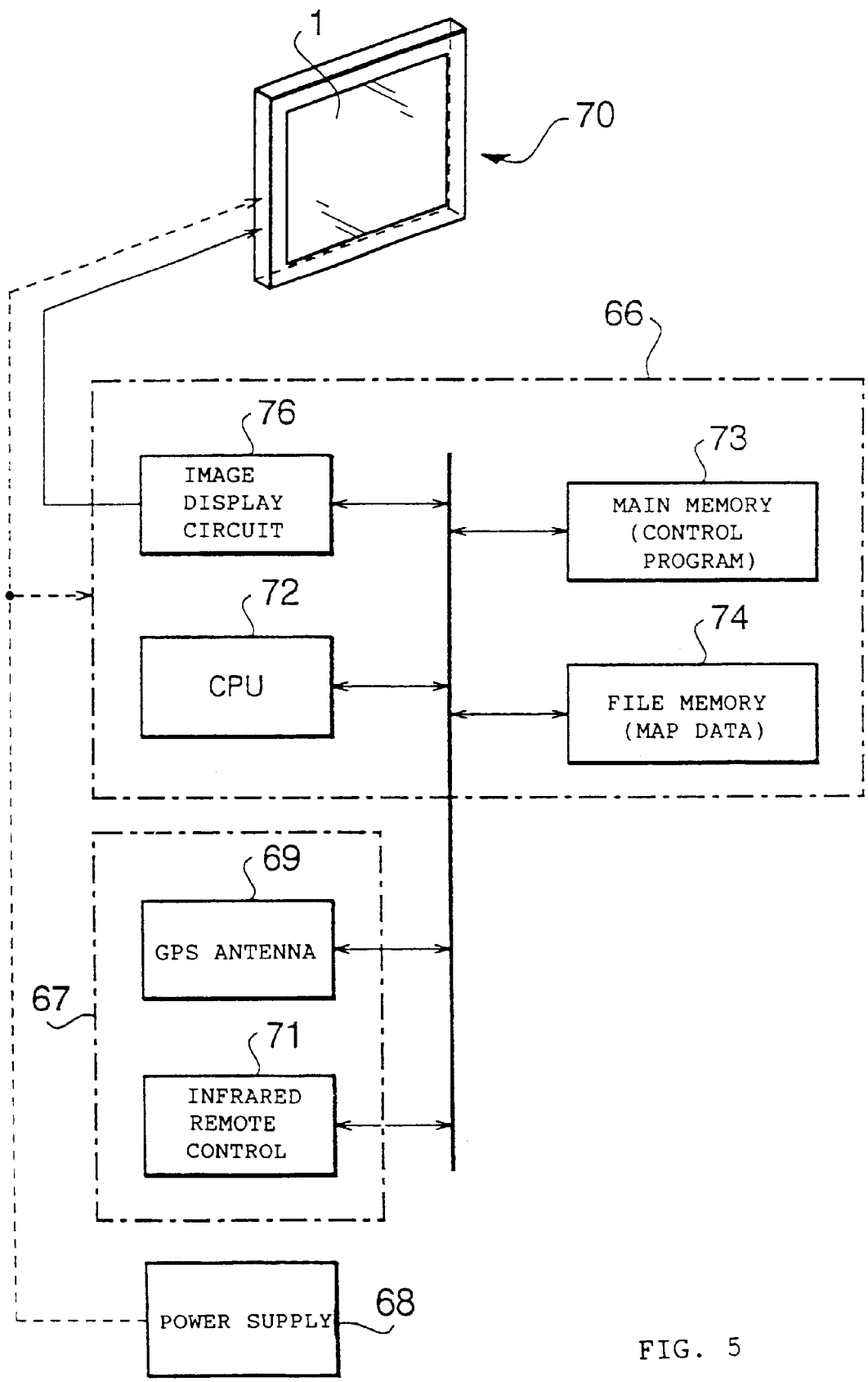
FIG. 5 is a diagram showing the outward appearance and an electric control system of an embodiment of an electronic apparatus according to the present invention.

FIG. 5 shows an embodiment of an electronic apparatus according to claim 4 of the present invention. In this embodiment, a liquid crystal device of the present invention is used as a display part in an electronic apparatus serving as a car navigation system. A car navigation system is an electronic apparatus in which the position of a vehicle on a map is displayed by using the GPS (Global Positioning System).

The car navigation system of this embodiment comprises a display part 70 including, for example, the liquid crystal device 1 shown in FIG. 3, a GPS control unit 66, an input device 67, and a power supply 68. The input device 67 includes a GPS antenna 69 and an infrared remote controller 71.

The GPS control unit 66 includes a CPU (central processing device) 72 for executing the general control for image display, a main memory 73 that stores a control program to be used in performing various computations, such as computations for analysis of the vehicle position and display of a map image, a file memory 74 that stores a map data file, and an image display circuit 76 for transmitting a driving signal for image display to the liquid crystal display part 70. The power supply 68 supplies electric power to the liquid crystal display part 70, and the GPS control unit 66.

(Modification)

While the present invention according to claims 1 and 4 has been described in its preferred embodiments, the present invention is not limited to the embodiments, and various modifications may be made within the scope of the present invention as defined in the claims.

Figure 4:
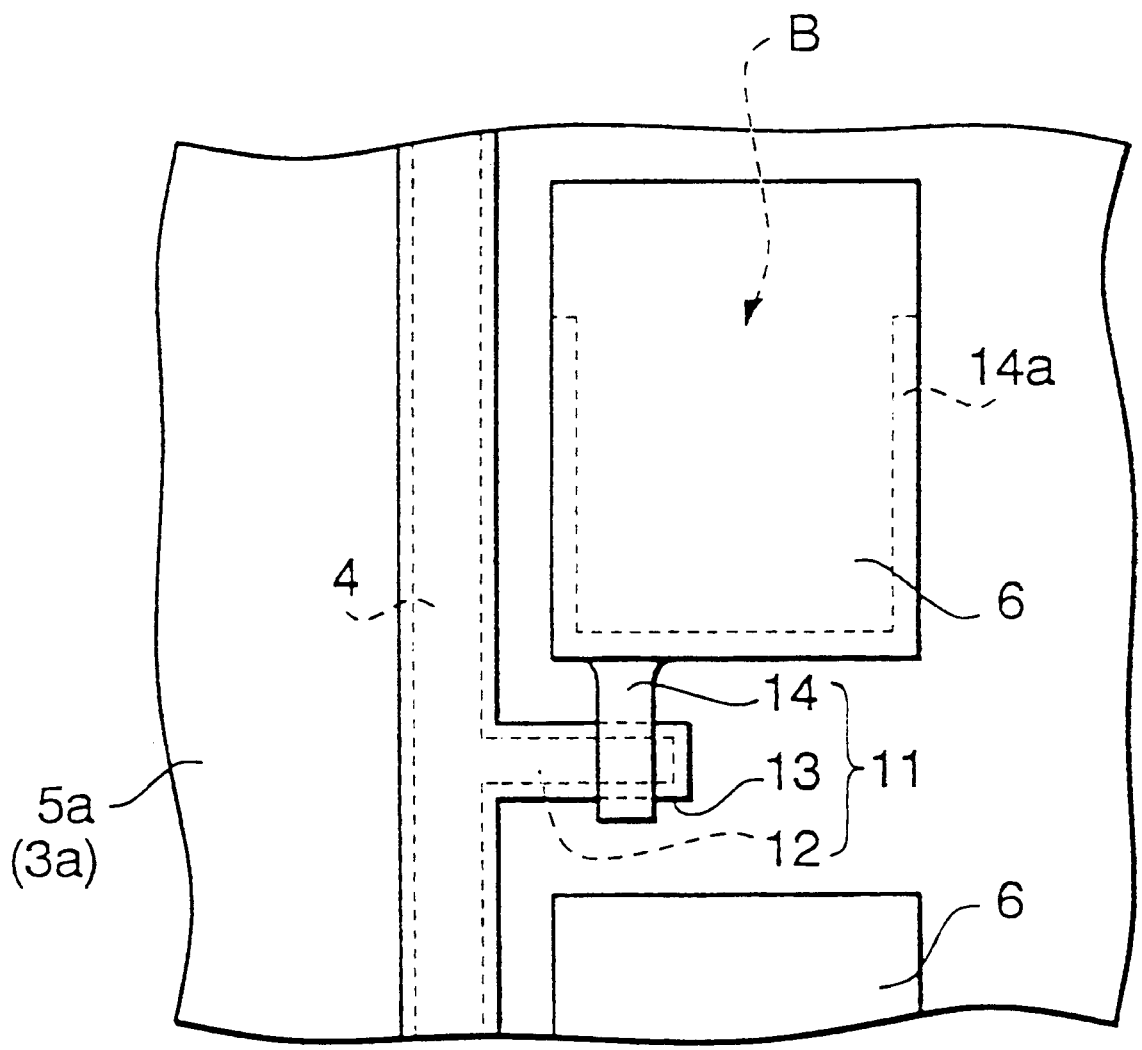
FIG. 4 is a plan view showing the principal part of another embodiment of the liquid crystal device according to the present invention.

For example, in reference to the liquid crystal device while the leading end 14*a* of the second electrode 14 in the MIM element 11 is disposed on the entire periphery of the pixel electrode 6 in the embodiment shown in FIG. 1, it may be opened on one side B, as shown in FIG. 4, instead of being shaped like a ring.

Figure 6:
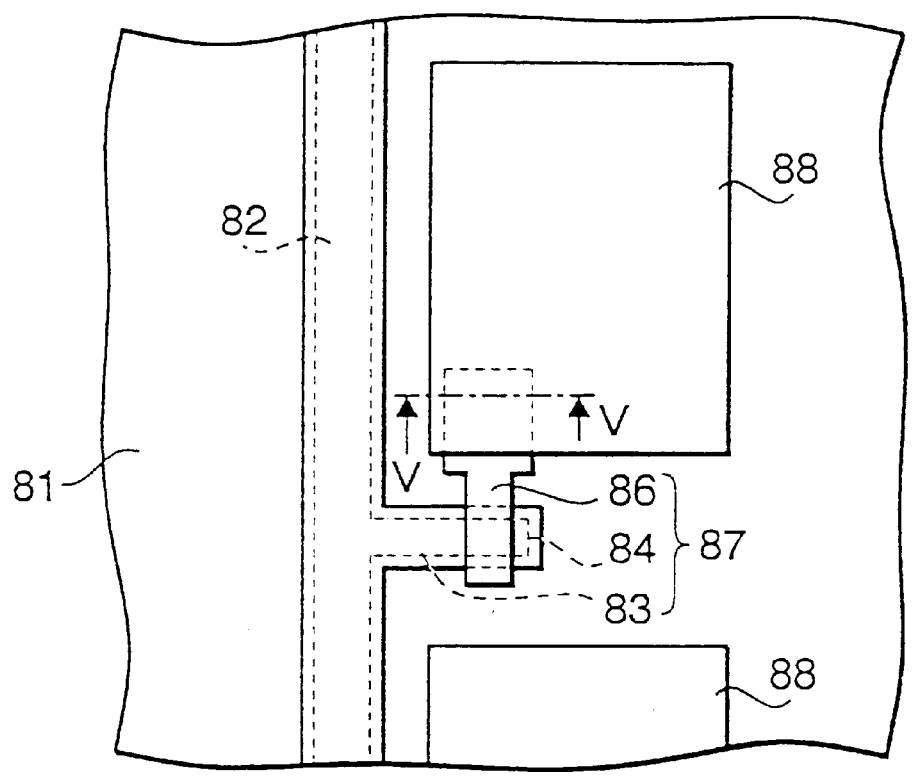
FIG. 6 is a plan view showing the principal part of an example of a conventional liquid crystal device.
Figure 7:
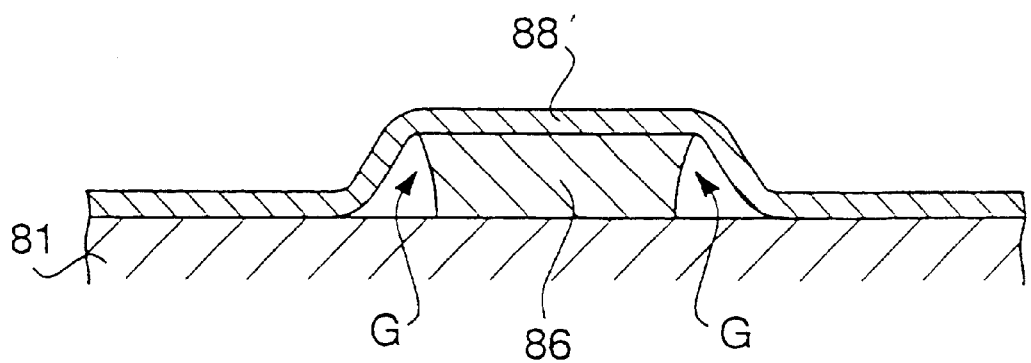
FIG. 7 is a schematic sectional view showing a step in manufacturing the conventional element structure shown in FIG. 6, taken along line V—V in FIG. 6.

In this modification, the possibility that etchant may enter the second electrode 14*a* is reduced, compared with the related art shown in FIG. 6. Therefore, it is possible to decrease the probability of wire breaks that occur between the pixel electrode 6 and the second electrode 14. When a comparison is made between the electrode leading end having the open portion B shown in FIG. 4 and the annular electrode leading end having no open portion shown in FIG. 1, the embodiment shown in FIG. 1 can more reliably prevent not only the entry of etchant, but also wire breaks.

The liquid crystal device shown in FIG. 3 uses the active matrix method using MIM elements and the COG (Chip On Glass) method. Of course, the present invention may be applied to liquid crystal devices using mounting methods other than the COG method, active-matrix liquid crystal devices using nonlinear elements other than the MIM elements, and the like.

In reference to the electronic apparatus while the present invention is applied to a car navigation system in the embodiment shown in FIG. 5, the present invention may be, of course, applied to other various electronic apparatuses, such as a portable electronic terminal apparatus, a video camera, and an electronic notebook.

(Third Embodiment)

Figure 10:
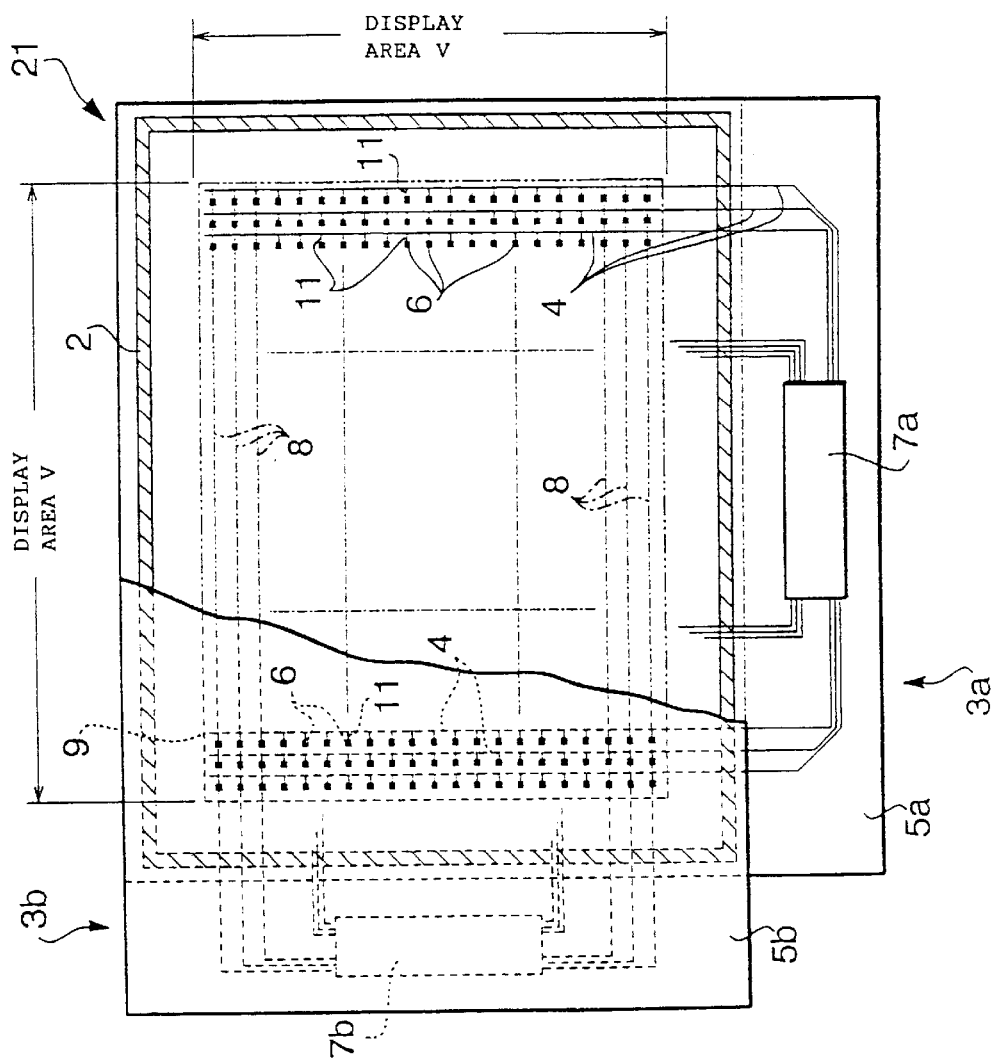
FIG. 10 is a partially cutaway plan view of an embodiment of the liquid crystal device according to the present invention.

FIG. 10 is a partially cutaway plan view of an embodiment of a liquid crystal device of the present invention. This liquid crystal device 21 has a pair of substrates bonded to each other by a sealing member 2 that is shaped like a rectangular ring by printing or the like, namely, an element substrate 3*a* and an opposite substrate 3*b*.

The element substrate 3*a* has a transmissive substrate 5*a* made of, for example, glass. On the surface of the transmissive substrate 5*a*, a plurality of wires 4 and a plurality of transparent pixel electrodes 6 are formed. The respective wires 4 are linearly shaped, and adjoining wires are arranged in parallel with each other. The respective pixel electrodes 6 are arranged in a line between the wires 4, and arranged in a matrix as a whole. Between each of the pixel electrodes 6 and the corresponding wire 4, a MIM element 11 is formed as a two-terminal type nonlinear element. The respective wires 4 are electrically connected to output terminals of a IC 7*a* that is mounted on an extended portion of the transmissive substrate 5*a*.

The opposite substrate 3*b* opposed to the element substrate 3*a* has a transmissive substrate 5*b* made of, for example, glass. A color filter 9 is formed on the surface of the transmissive substrate 5*b*, and opposite electrodes 8 are further formed on the surface of the color filter 9. The opposite electrodes 8 are linearly shaped, and adjoining opposite electrodes 8 are arranged in parallel with each other. These opposite electrodes 8 are electrically connected to output terminals of a liquid crystal driving IC 7*b* that is mounted on an extended portion of the transmissive substrate 5*b*.

Figure 8:
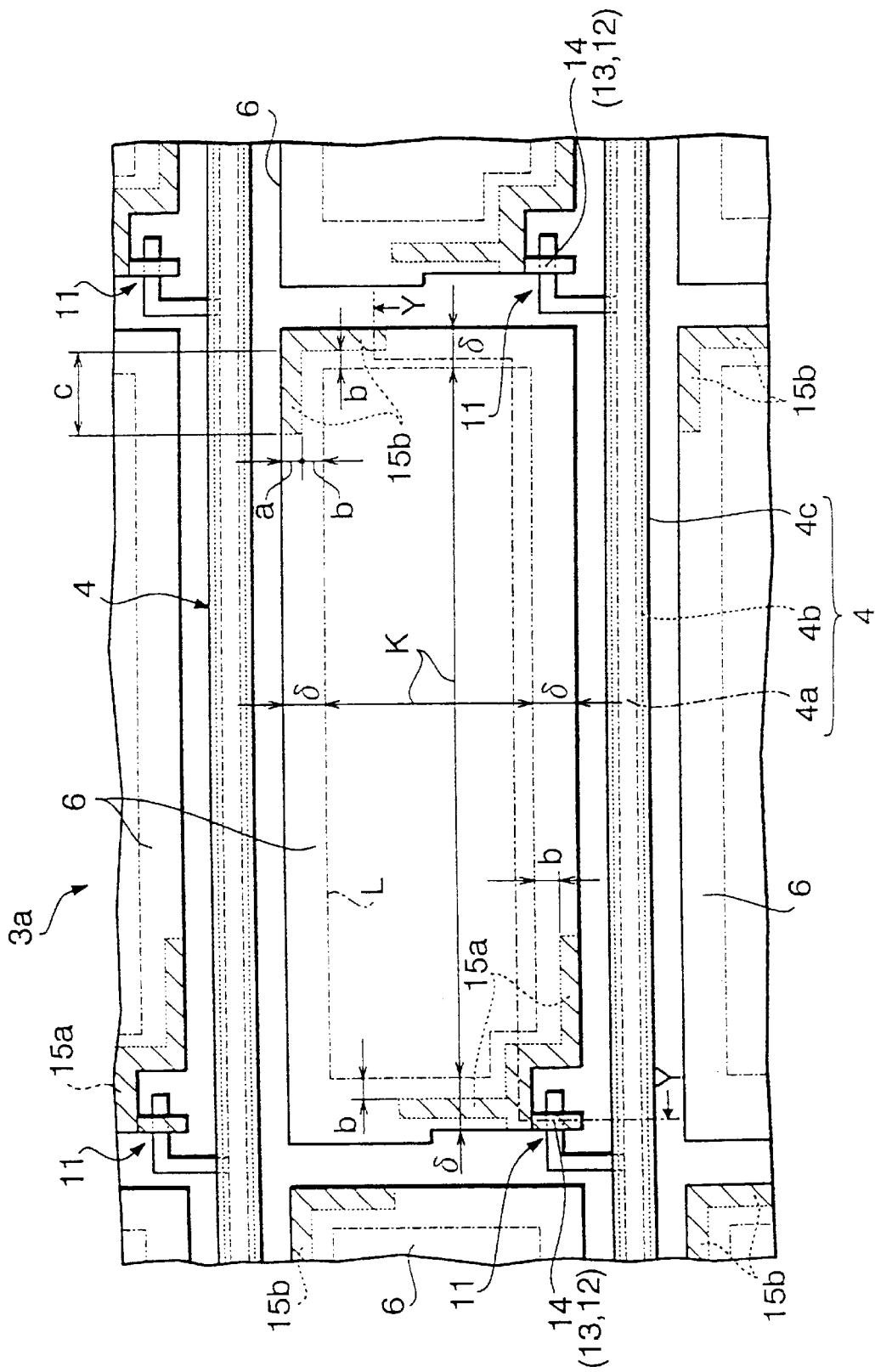
FIG. 8 is a plan view showing the principal part of an embodiment of a liquid crystal device according to the present invention, in particular, one pixel electrode formed in an element substrate and the surroundings thereof.
Figure 9:
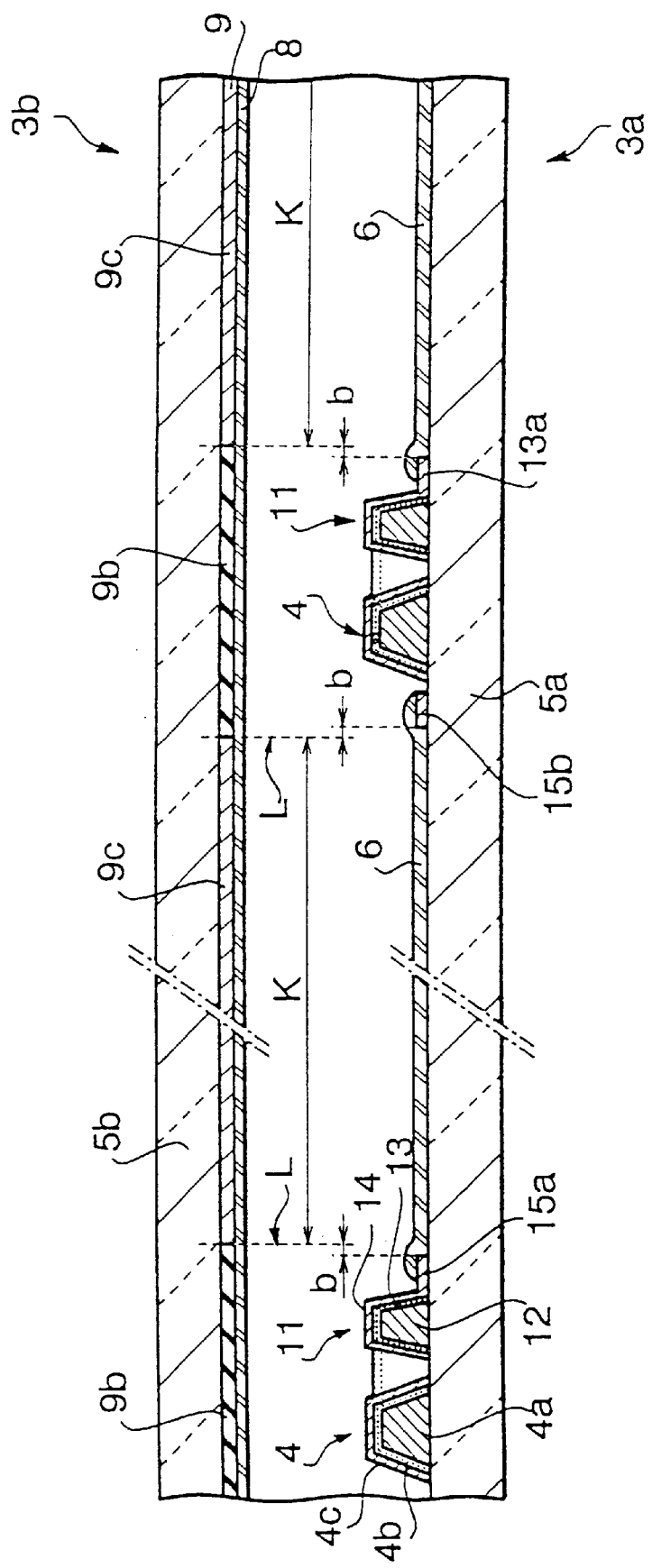
FIG. 9 is a sectional view showing the sectional structure taken along line Y—Y in FIG. 8.

The surroundings of one of the plural pixel electrodes 6 that are formed on the element substrate 3*a* are observed under magnification as shown in FIG. 8. The sectional structure taken along a break line Y—Y in FIG. 8 is shown in FIG. 9. Referring to these figures, a wire 4 is formed by laying a first layer 4*a*, a second layer 4*b*, and a third layer 4*c* one on top of another. An MIM element 11 is formed by laying a first electrode 12, an insulating layer 13, and a second electrode 14 one on top of another.

The first layer 4*a* of the wire 4 and the first electrode 12 of the MIM element 11 are both made of a conductive metal, for example, Ta (tantalum), and have a thickness of about 2000 Å. The second layer 4*b* of the wire 4 and the insulating layer 13 of the MIM element 11 are both formed of, for example, an anodized film, and have a thickness of about 500 Å. The third layer 4*c* of the wire 4 and the second electrode 14 of the MIM element 11 are both made of a conductive metal, for example, Cr (chromium). The pixel electrode 6 is made of, for example, transparent ITO (Indium Tin Oxide), and is placed so that it overlaps with the leading end of the second electrode 14 of the MIM element 11 to be electrically connected thereto.

Referring to FIG. 9, the color filter 9 formed between the transmissive substrate 5*b* and the opposite electrodes 8 in the opposite substrate 3*b* includes color dot portions 9*c* of a plurality of colors, such as R (red), G (green), and B (blue), and a black matrix 9*b* formed between the respective color dot portions 9c. Each of the color dot portions 9c aligns with an opening portion K surrounded by the black matrix 9b. When the element substrate 3a and the opposite substrate 3b are bonded in a proper positional relationship, the entire region of the black matrix opening portion K is positioned inwardly offset from the peripheral edge line of the pixel electrode 6 by a distance δ, as shown in FIG. 8.

In this embodiment, two branch portions 15a and 15a extending along two sides of the pixel electrode 6 are formed at the leading end of the second electrode 14 of the MIM element 11. Moreover, two branch portions 15b and 15b extending along two sides of the pixel electrode 6 are formed at the corner of the pixel electrode 6 that is diagonally opposite to the second electrode 14. These branch portions 15a and 15b are all made of the same material as that of the second electrode 14, in this embodiment, Cr. Cr is a material having a higher light-shielding ability than that of ITO serving as the material of the pixel electrode 6. The branch portions 15a and 15b made of Cr function as position check marks for use in detecting the offset between the black matrix opening portion K and the pixel electrode 6.

The liquid crystal device of this embodiment has the configuration mentioned above. Accordingly, referring to FIG. 10, the opposite electrodes 8 are selectively scanned line by line by the liquid crystal driving IC 7b, and simultaneously a predetermined voltage is applied to the MIM elements of desired pixels by the liquid crystal driving IC 7a, whereby the alignment of liquid crystal contained in the corresponding pixels is controlled, and a desired visible image is displayed in a display area V of the liquid crystal device 21. At this time, the black matrix 9b in FIG. 9 for shielding from light the area except the opening portions K prevents extra light from leaking outside, which achieves a high-contrast display.

In order for the black matrix 9b to show a predetermined level of light-shielding ability, the opening portions K and the pixel electrodes 6 need to be opposed to each other in a proper positional relationship. In this embodiment, the positional relationship between each opening portion K and each pixel electrode 6 is checked by using a pair of position check marks 15a and 15b that are formed at the opposite corners of the pixel electrode 6.

Specifically, for example, (1) a peripheral line L of the black matrix opening portion K and the branch portions 15a and 15b serving as position check marks are compared. If all the four branch portions 15a and 15b are hidden by the black matrix 9b and do not appear in the opening portion K, it is determined that the device is good. (2) If any of the four branch portions 15a and 15b appears partially in the opening portion K and it does not appear entirely in the opening portion K, it is determined that the device is good. (3) If any one of the four branch portions 15a and 15b appears entirely in the opening portion K, the offset between the opening portion K and the pixel electrode 6 exceeds the permitted limit, and it is determined that the device is defective.

Examples of dimensions of the branch marks 15a and 15b for position checking will be given for plain explanation. Referring to FIG. 9, when a proper gap δ between the opening portion K and the pixel electrode 6 is equal to 10 μm, a width a of the respective branch marks 15a and 15b may be equal to 5 μm, and a distance b between the respective branch marks 15a and 15b and the peripheral line L of the open portion may be equal to 5 μm. A length c of the respective branch marks 15a and 15b may be equal to about 15 μm.

While one complete liquid crystal device has been described above, a description will be given of a manufacturing method of manufacturing such a liquid crystal device as follows.

Figure 11:
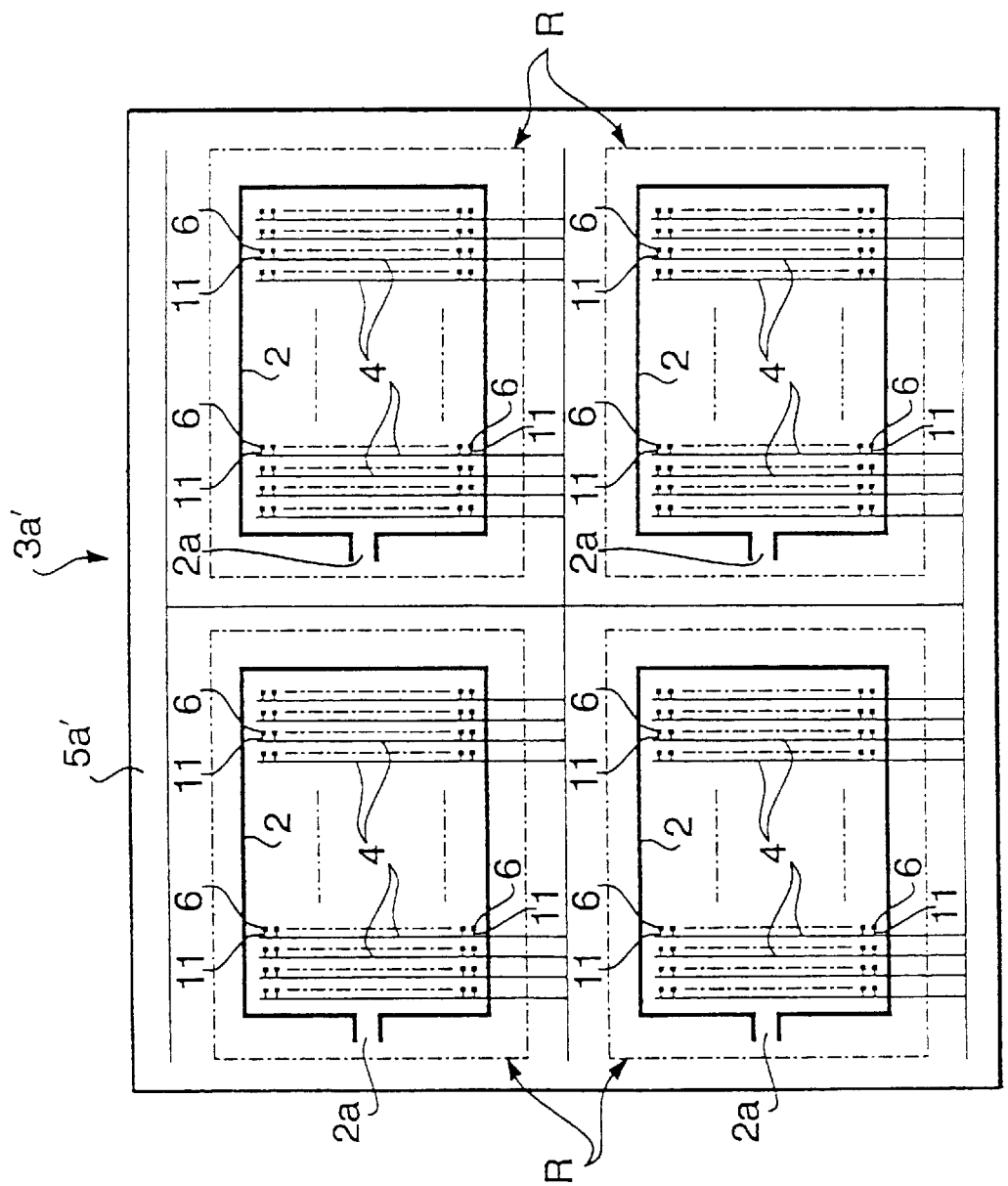
FIG. 11 is a plan view of an element substrate base material that is prepared during a series of steps for constituting a manufacturing method of manufacturing a liquid crystal device of the present invention.

First, as shown in FIG. 11, a transmissive substrate base material 5a' made of, for example, glass and having a large area is prepared, and pixel electrodes 6, MIM elements 11 and wires 4 for a plurality of liquid crystal panels are formed on the surface of the substrate base material 5a'. In this embodiment, a description will be given of a case in which four regions R each for one liquid crystal panel are formed on the element substrate base material 5a', namely, four liquid crystal panels are to be obtained. The position check marks 15a and 15b shown in FIG. 8 are formed simultaneously with the formation of the second electrode 14 (see FIG. 9) of the MIM element 11 by patterning, and therefore, they do not need a special step.

An alignment film is further formed on the element substrate base material 5a' having the MIM elements 11 and the like, and is subjected to an alignment process such as rubbing. Moreover, a sealing member 2 is formed by printing or the like around the pixel electrodes 6 in each of the liquid crystal panel regions R. Thus, the element substrate base material 3a' having element substrates for four liquid crystal panels are fabricated. Numeral 2a denotes a liquid crystal inlet for filling liquid crystal therethrough.

Figure 12:
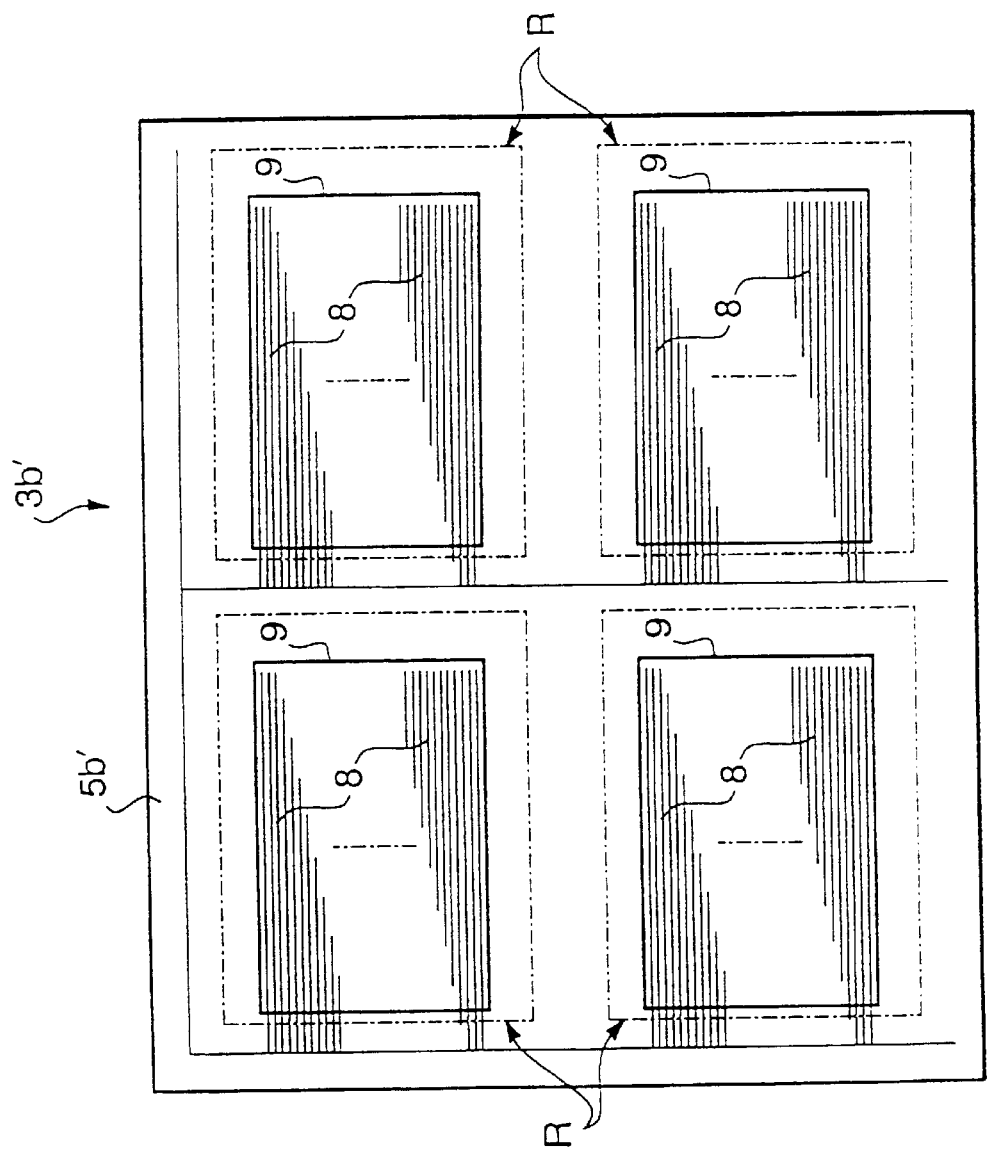
FIG. 12 is a plan view of an opposite substrate base material that is prepared during the series of steps for constituting the manufacturing method of manufacturing the liquid crystal device of the present invention.

On the other hand, a transmissive substrate base material 5b' made of glass and having a large area as shown in FIG. 12 is prepared besides the transmissive substrate base material 5a' for an element substrate base material 3a'. Four liquid crystal panel regions R are set on the surface of the transmissive substrate base material 5b', and a color filter 9 and opposite electrodes 8 are formed in each of the liquid crystal panel regions R, whereby an opposite substrate base material 3b' having a large area is formed.

Next, the element substrate base material 3a' shown in FIG. 11 and the opposite substrate base material 3b' shown in FIG. 12 are bonded so that the liquid crystal panel regions R in the respective base materials precisely align with each other, thereby forming an empty panel having a large area. Usually, alignment marks are formed at appropriate positions of the element substrate base material 3a' and the opposite substrate base material 3b', and the bonding is performed with reference to the marks.

A cutting line, what is called a scribe line, is formed at a predetermined position around each of the liquid crystal panel regions R. Either the element substrate base material 3a' or the opposite substrate base material 3b' is cut at the liquid crystal inlets 2a along the scribe lines, so that the liquid crystal inlets 2a are exposed to the outside. Liquid crystal is filled into the respective liquid crystal panel regions R through the liquid crystal inlets 2a. After the completion of filling, the liquid crystal inlets 2a are sealed. Thereby, a large-area panel filled with liquid crystal is fabricated. After that, individual liquid crystal panels are cut out one by one by cutting the large-area panel along the scribe lines formed around the respective liquid crystal panel regions R, and one liquid crystal panel shown in FIG. 10 is completed.

As described with reference to FIG. 8, the offset between the black matrix opening portion K and the pixel electrode 6 can be precisely detected in a short time by using the position check marks 15a and 15b in the liquid crystal device of the present invention. The detection step may be carried out for each of the liquid crystal devices 1 that are finally obtained (see FIG. 10), in the state in which the large-area panel is empty, or in the state in which the large-area panel is filled with liquid crystal before scribing. When defectives are previously selected by subjecting the large-area panel, which is empty or filled with liquid crystal, to a position check, it is possible to omit the subsequent processes for the defectives, and to thereby improve operation efficiency.

(Fourth Embodiment)

Figure 13:
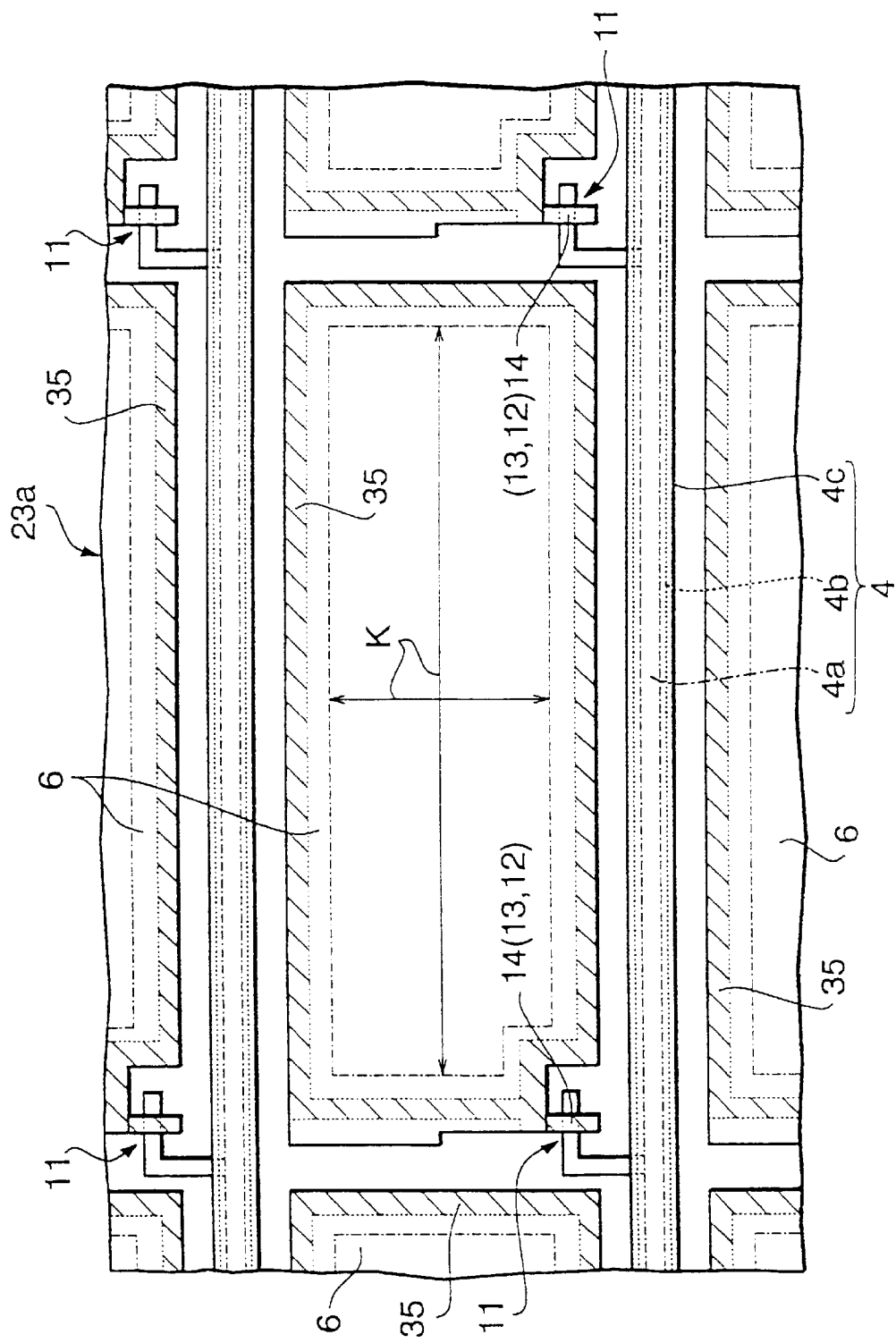
FIG. 13 a plan view showing the principal part of another embodiment of the liquid crystal device according to the present invention, in particular, one of pixel electrodes formed in an element substrate and the surroundings thereof.

FIG. 13 shows the principal part of another embodiment of a liquid crystal device in particular, one of a plurality of pixel electrodes formed on the surface of an element substrate and the surroundings thereof. The same numerals given to constituents of an element substrate 23a as in FIG. 8 denote the same constituents, and a description thereof will be omitted.

The element substrate 23a in this embodiment is different from the element substrate 3a shown in FIG. 8 in that a position check mark 35 is shaped like a frame on the entire outer periphery of a pixel electrode 6, while a pair of position check marks 15a and 15b are formed at the opposite corners of the pixel electrode 6 on the element substrate 3a. This position check mark 35 can also be formed simultaneously with the formation of a second electrode 14 of a MIM element 11.

Since the position check mark 35 is formed on the entire periphery of the pixel electrode 6 in this embodiment, when the offset between a black matrix opening portion K and the pixel electrode 6 is checked by using the position check mark 35, the check can be made at any point on the mark 35. As a result, a more precise judgement is possible.

(Fifth Embodiment)

Figure 14:
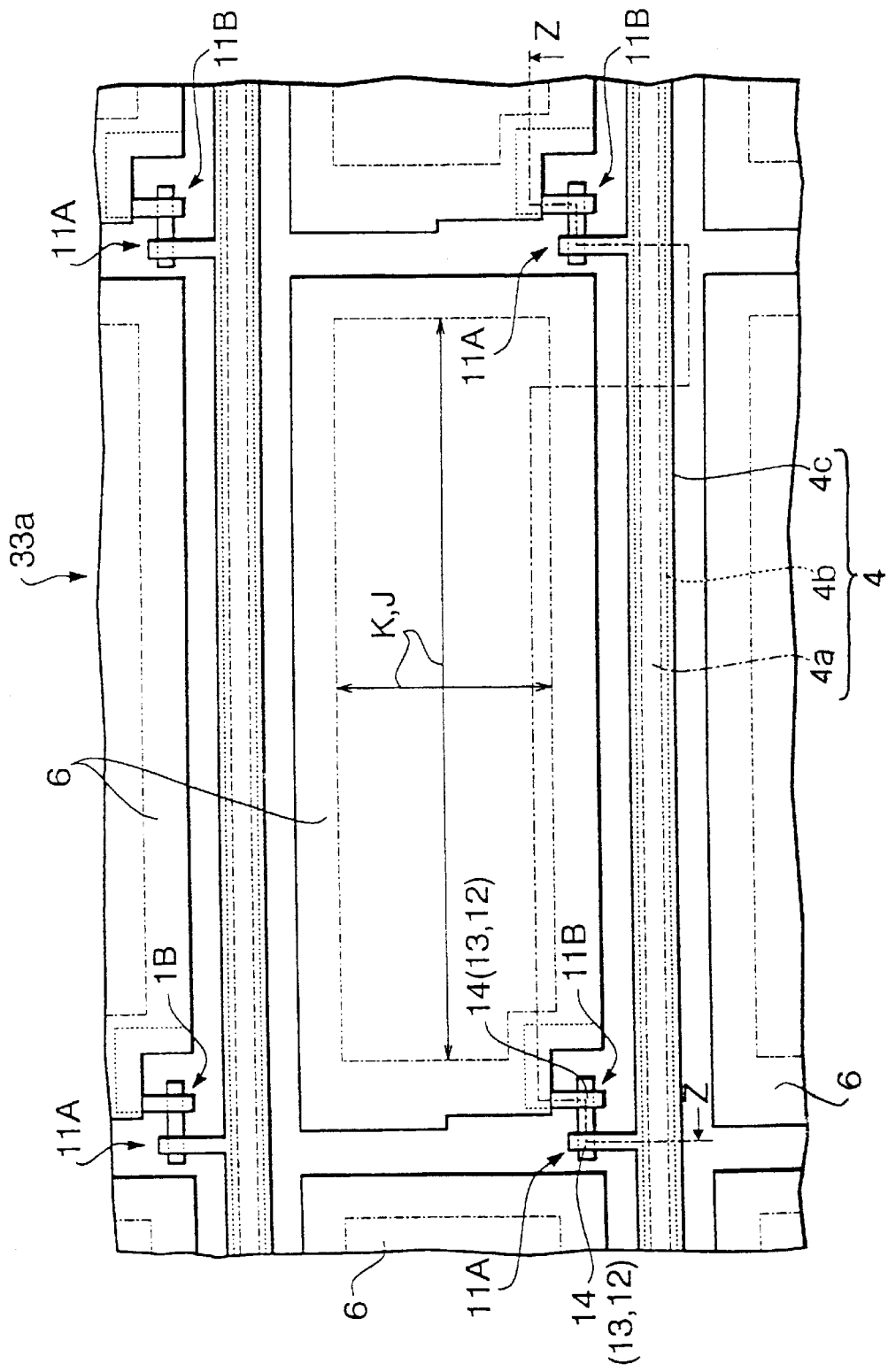
FIG. 14 is a plan view showing the principal part of a further embodiment of the liquid crystal device according to the present invention, in particular, one of pixel electrodes formed in an element substrate and the surroundings thereof.
Figure 15:
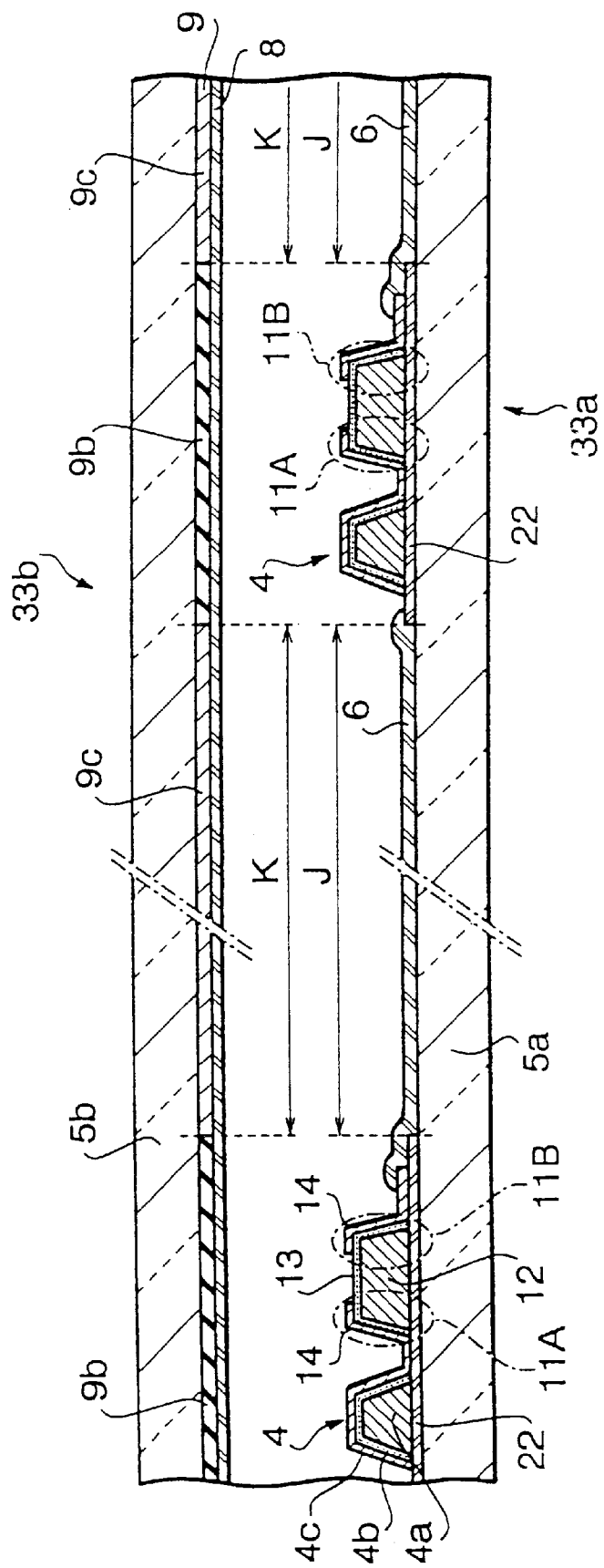
FIG. 15 is a sectional view showing the sectional structure taken along line Z—Z in FIG. 14.

FIGS. 14 and 15 show the principal part of a further embodiment of the liquid crystal device. In particular, FIG. 14 shows one of a plurality of pixel electrodes formed on the surface of an element substrate, and the surroundings thereof, and FIG. 15 shows the sectional structure taken along line Z—Z in FIG. 14.

In this embodiment, the present invention is applied to a liquid crystal device including MIM elements having what is called a back-to-back structure. Regarding the MIM elements having the back-to-back structure, a pair of MIM elements 11A and 11B are connected in series in an electrically inverse relationship, as shown in FIG. 14, thereby stabilizing the switching characteristics of the MIM elements. These MIM elements 11A and 11B have a layered structure including a first electrode 12, an insulating layer 13, and a second electrode 14, respectively.

In the liquid crystal device using this type of MIM element having the back-to-back structure, in order to improve the adhesion of the MIM elements 11A and 11B, an underlayer 22 having a uniform thickness and made of tantalum oxide (TaOX) is formed in most cases on the surface of a transmissive substrate 5a of an element substrate side 33a in advance to the formation of the first electrodes 12 of the MIM elements 11A and 11B. When such an underlayer 22 remains between the pixel electrode 6 and the transmissive substrate 5a, the light transmittance at the pixel electrode 6 decreases and a display area of the liquid crystal device becomes dark.

In order to solve this problem, it is effective to carry out, in a series of steps of manufacturing the element substrate 33a, the steps of removing the underlayer 22, which exists in a predetermined area for forming the pixel electrode 6 therein, after forming the second electrodes 14 of the MIM elements 11A and 11B and before laying the pixel electrode 6 at the leading end of the second electrode 14, and then forming the pixel electrode 6. The region denoted by the numeral J in FIG. 15 represents the outer peripheral line of a removed area in case when the underlayer 22 is removed at a predetermined area, namely, the peripheral line of the underlayer 22.

In this embodiment, when a part of the underlayer 22, which is formed on the transmissive substrate 5a to improve the adhesion of the MIM elements 11A and 11B, corresponding to the pixel electrode 6 is removed, the size of the removed area is set equal to that of the black matrix opening portion K. The peripheral line J of the underlayer 22 that is caused to appear by removing the underlayer 22 serves as a position check mark for use in checking the offset between the element substrate 33a and an opposite substrate 33b.

Since the peripheral line J of the removed area of the underlayer 22 is always formed in a fixed positional relationship to the pixel electrode 6, it is possible to precisely confirm whether the opposite substrate 33b and the element substrate 33a are offset from each other, by comparing the peripheral line J and the black matrix opening portion K. Moreover, since TaOX serving as the material of the underlayer 22 has a higher light-shielding ability than that of ITO for forming the pixel electrode 6, the peripheral line J and the black matrix opening portion K can be even more easily seen than the case in which the peripheral edge of the black matrix opening portion K is compared with the peripheral edge of the pixel electrode 6, and therefore, the offset can be precisely detected in a short time.

(Modification)

While the liquid crystal device according to claim 5 has been described above in its preferred embodiments, the present invention is not limited to those embodiments. Various modifications may be made within the scope of the present invention as defined in the claims.

For example, the position check mark is not always limited to the mark having two branch portions as shown in FIG. 8, and it may have no branch portion. Furthermore, the material of the position check mark is not limited to the same material as that of the second electrode of the MIM element, and it may be the same as the material of the first electrode of the MIM element, or a material that is not related to the MIM element. However, the use of the same material as that of the MIM element is advantageous because the position check mark can be simultaneously formed in a predetermined step of forming the MIM element.

Furthermore, the second electrode of the MIM element and the pixel electrode may be integrally formed by making the second electrode of, for example, ITO, being the same material as that of the pixel electrode. This allows the step of forming the second electrode to be omitted. In this case, the position check mark is made of the same material as that of the first electrode.

A reference mark on the opposite substrate side to be compared with the position check mark formed on the element substrate side is not limited to the black matrix opening portion. For example, the peripheral lines of respective color dots of R, G, and B in the color filter formed on the opposite substrate may be used as the subject of comparison.

The nonlinear element is not limited to the MIM element. While the element substrate base material and opposite substrate base material having a large area for four liquid crystal panels are used in the above description, of course, it may be possible to use substrate base materials having such a size that a plurality of, less or more than four, liquid crystal panels are manufactured.

While the liquid crystal device shown in FIG. 10 is what is called a COG (Chip On Glass) liquid crystal device having a structure in which a liquid crystal driving IC is directly mounted on a transmissive substrate, the present invention may be applied to liquid crystal devices having other arbitrary structures, for example, a liquid crystal device using a TAB (Tape Automated Bonding) method.

(Sixth Embodiment)

Figure 16:
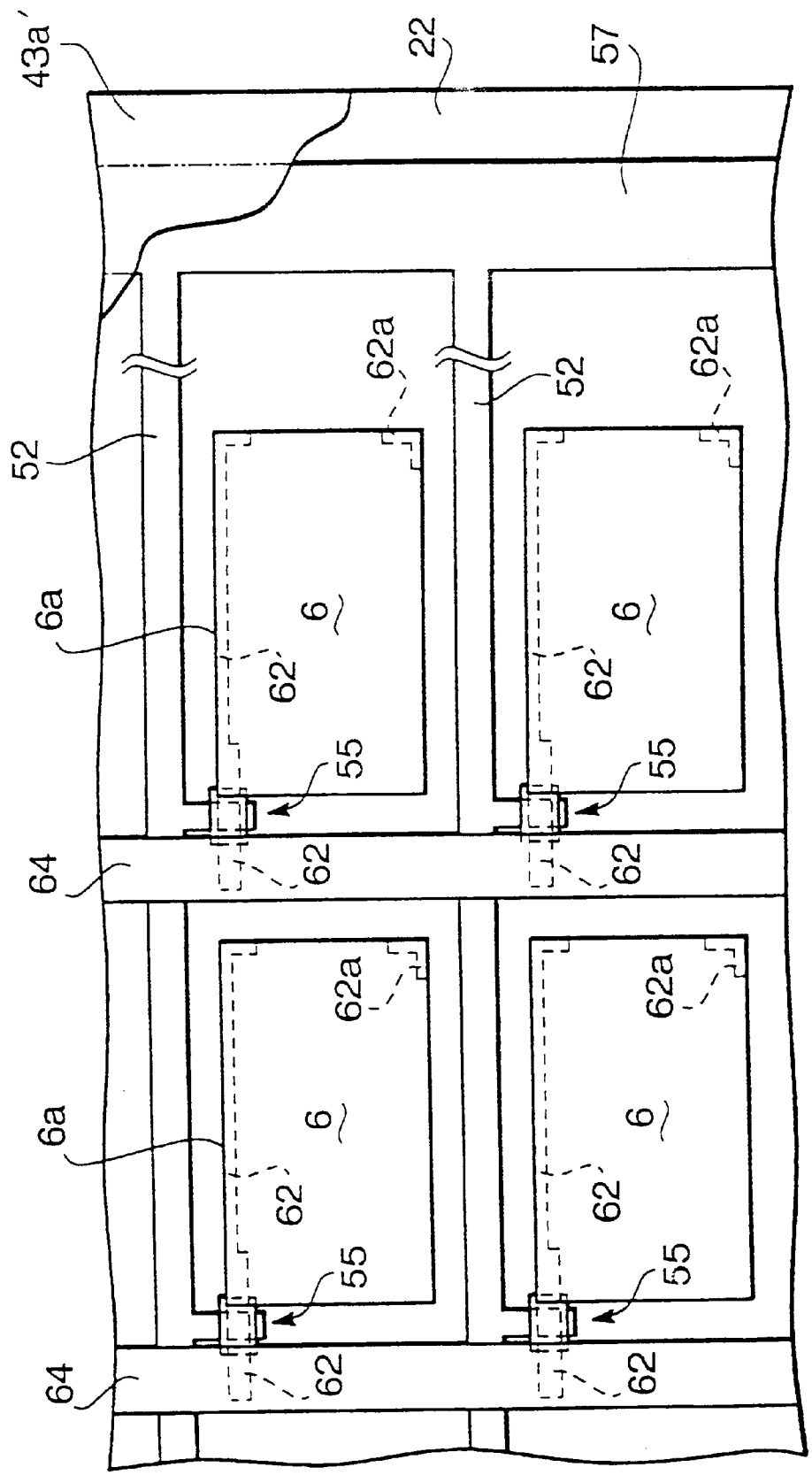
FIG. 16 is a plan view showing the principal part of a still further embodiment of the liquid crystal device according to the present invention.

FIG. 16 shows a further embodiment of the liquid crystal device according to claims 1 and 5, and in particular, shows individual pixels on a large-area element substrate base material 43*a'* in an enlarged plan view. Referring to this figure, one pixel is mainly composed of one pixel electrode 6. An underlayer 22 having a uniform thickness is formed on the entire surface of the element substrate base material 43*a'*, and a plurality of linear gate electrode lines 52 are formed thereon in parallel with one another. A current carrying pattern 57 is formed for the gate electrode lines 52. This current carrying pattern 57 supplies electric current to the gate electrode lines 52.

Figure 17:
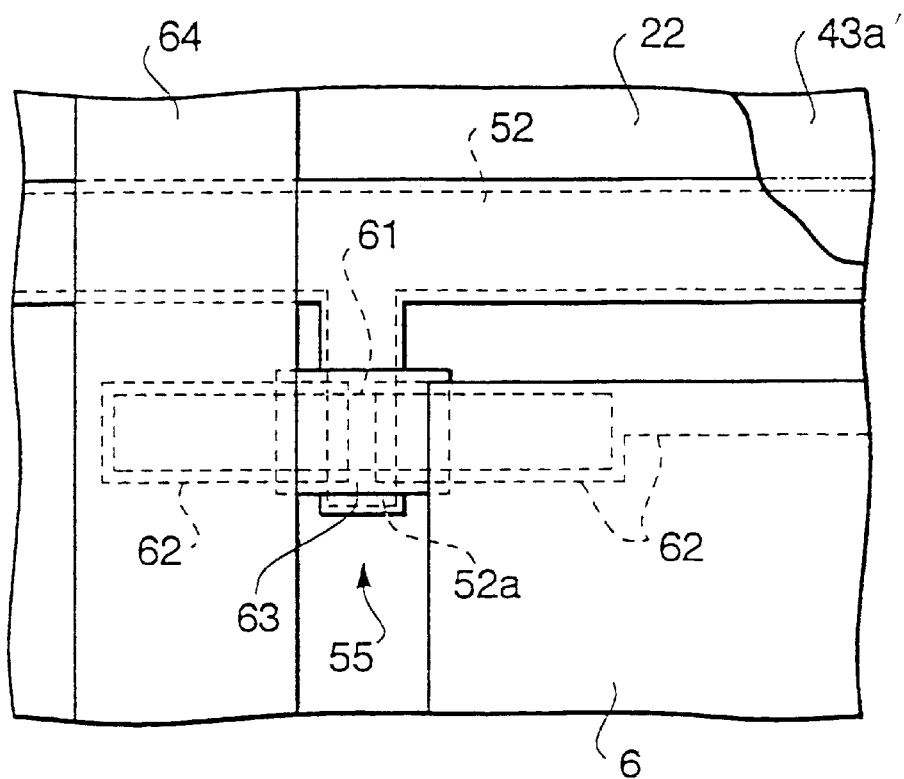
FIG. 17 is a plan view showing the neighborhood of a TFT element in the principal part of FIG. 16.
Figure 18:
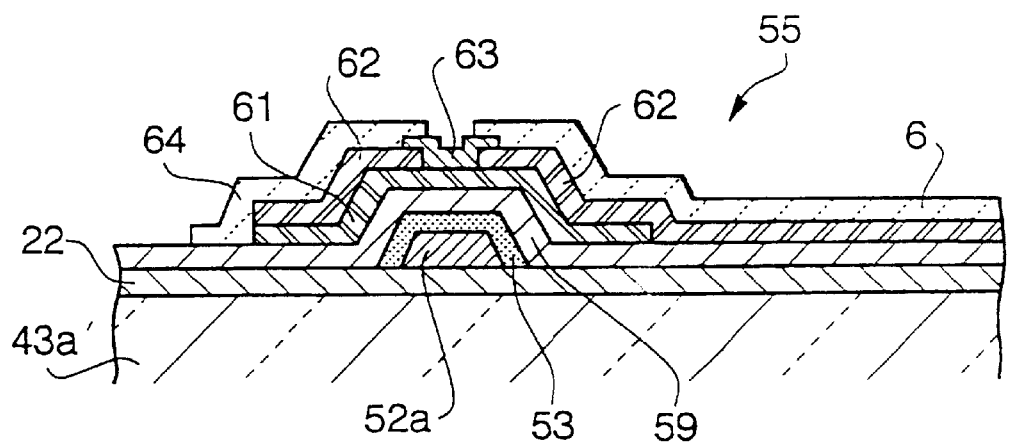
FIG. 18 is a sectional view showing the sectional structure of the TFT element shown in FIG. 17.

A gate electrode line 52 and a pixel electrode 6 are connected to each other via a TFT element 55 serving as an active element, as shown in FIG. 17. This TFT element 55 is formed, as shown in FIG. 18, by laying on the underlayer 22 the following layers one on top of another, namely, a gate electrode 52*a,* an anodized film 53 serving as a gate insulating film, a nitride film 59 serving as another gate insulating film, an a-Si (amorphous silicon) film 61 serving as a channel-part intrinsic semiconductor film, a $N^+$a-Si (doped amorphous silicon) film 62 serving as a contact-part semiconductor film, and a channel-part protective nitride film 63.

Referring to FIG. 16, a plurality of linear source electrode lines 64 are formed in parallel on the surface of the element substrate base material 43*a'* in such a positional relationship that they intersect the gate electrode lines 52. These source electrode lines 64 each are laid on one side (left side in FIG. 17) of the $N^+$a-Si film 62, as shown in FIGS. 17 and 18. On the other side (i.e., right side in FIG. 17) of the $N^+$a-Si film 62, the pixel electrode 6 is overlaid.

Figure 19:
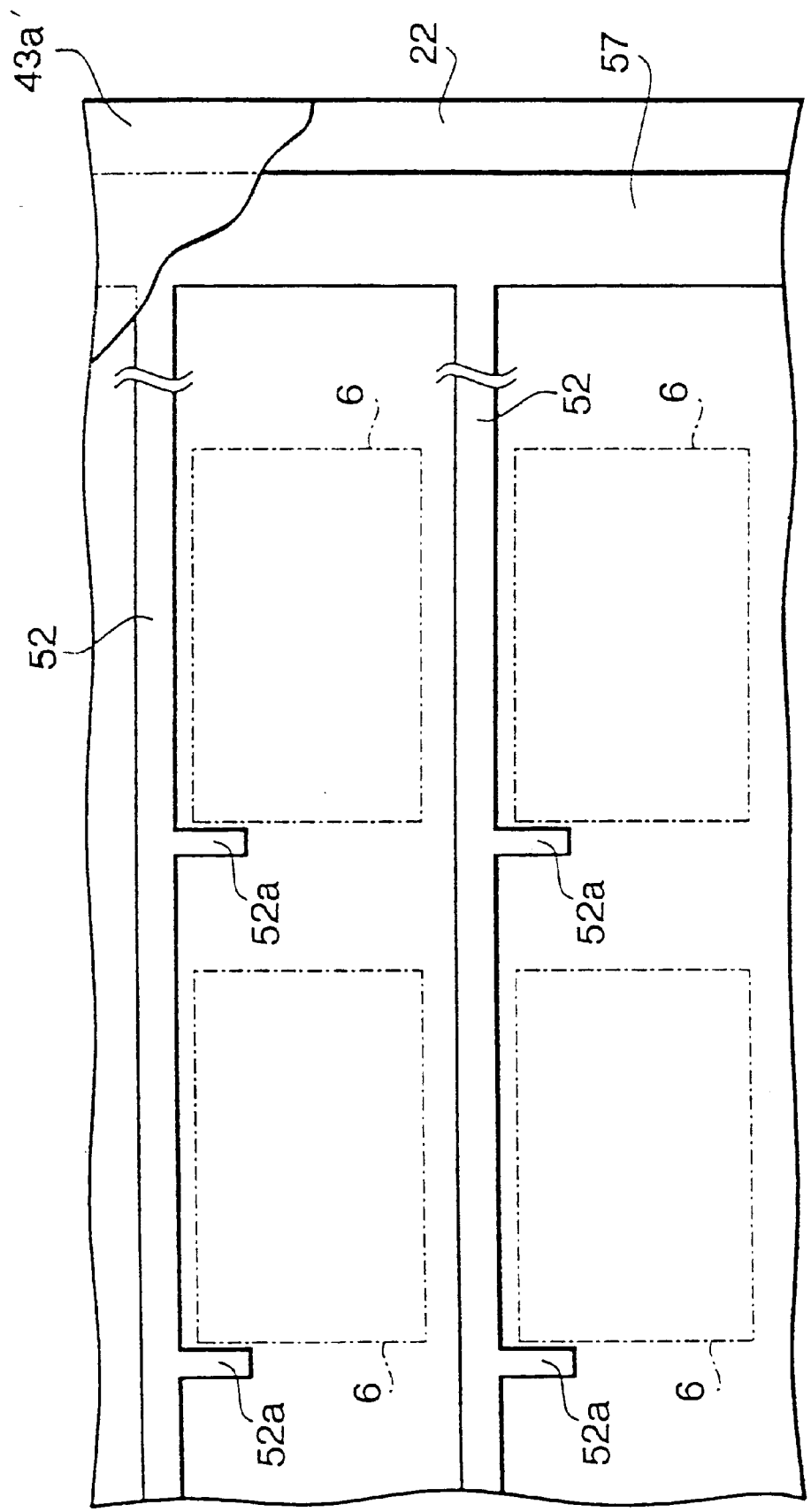
FIG. 19 is a plan view showing a state of an element substrate base material shown in FIG. 16 during manufacturing.

The TFT element 55 having the structure mentioned above is formed as follows, for example. Namely, referring to FIG. 19, first, the element substrate base material 43*a'* made of glass or the like is prepared, and $Ta_2O_5$ or the like having a uniform thickness is formed thereon by sputtering or the like, thereby forming the underlayer 22.

Next, Ta is patterned on the underlayer 22 by a known patterning technique, for example, lithography to form the plural linear gate electrode lines 52, the gate electrodes 52*a* for the TFT element that project from the gate electrode lines 52, and the current carrying pattern 57 for linking the gate electrode lines 52 of the respective liquid crystal device portions.

After that, an anodizing process is carried out by dipping the element substrate base material 43*a'* in an electrolyte, namely, an anodizing solution, and applying a predetermined voltage to the current carrying pattern 57. Thereby, the anodized film 53 is formed on the gate electrodes 52*a* and other patterns.

Next, referring to FIG. 18, the gate protective film 59 is formed on each of the anodized films 53 formed as mentioned above by patterning $Si_3N_4$ by CVD for example. Furthermore, a-Si is uniformly overlaid, and $N^+$a-Si is further uniformly overlaid thereon. The contact-part semiconductor films 62 are formed by patterning $N^+$a-Si by photoetching or the like, and the channel-part intrinsic semiconductor films 61 are formed by patterning a-Si.

After that, the channel-part protective films 63 are formed by patterning $Si_3N_4$ by using a known patterning technique, and the pixel electrodes 6 are formed in a matrix by patterning ITO (Indium Tin Oxide) in a predetermined dot-like form so as to partly overlie on the $N^+$a-Si films 62. Furthermore, the source electrode lines 64 are formed in parallel by patterning Al (aluminum) so as to partly overlie on the $N^+$a-Si films 62.

Then, an alignment film having a uniform thickness is formed on the surface of the substrate, and is subjected to uniaxial alignment treatment, for example, rubbing treatment. Furthermore, a ring-shaped sealing member is formed by screen-printing or the like. Thereby, the predetermined process for the element substrate base material is completed.

After that, a large-area panel structure is formed by overlaying the opposite substrate base material, which is prepared separately from the element substrate base material, on the element substrate base material, and liquid crystal is sealed into the liquid crystal device parts of the respective panel structure. A plurality of liquid crystal panels each for one liquid crystal device are formed by cutting the panel structure, and a polarizer, a liquid crystal driving IC and the like are mounted on each of the liquid crystal panels, whereby a plurality of desired liquid crystal devices are manufactured.

In this embodiment, when the $N^+$a-Si films 62 are formed as element-side electrodes by photoetching or the like, they are shaped like a pattern extending along the edge of one side 6*a* of the pixel electrode 6, as shown in FIG. 16. Since the $N^+$a-Si film 62 has a higher light-shielding ability than that of the pixel electrode 6, it can function as a mark having a high light-shielding ability that causes the edge of the pixel electrode 6 to visually stand out. In this embodiment, a $N^+$a-Si film 62*a* is also formed at the corner of the pixel electrode 6 that is diagonally opposite the corner where the TFT element 55 is provided. This $N^+$a-Si film 62*a* mainly functions as a mark having high light-shielding ability that causes the edge of the pixel electrode 6 to visually stand out. As mentioned above, according to this embodiment, since the $N^+$a-Si film 62 is formed in a pattern along the edge of one side 6*a* of the pixel electrode 6, it is possible to prevent etchant from entering between the $N^+$a-Si film 62 and the ITO film in forming the pixel electrode 6 by etching the ITO film, and to thereby prevent a wire break therebetween.

Since the $N^+$a-Si films 62 and 62*a* having a higher light-shielding ability than that of the pixel electrode 6 are formed corresponding to the opposite corners of the pixel electrode 6, when the opposite substrate base material (see FIG. 12) is bonded to the element substrate base material 43*a'*, it is possible to easily and precisely determine whether or not the element substrate base material and the opposite substrate base material are in a proper positional relationship by visually comparing the mark formed on the element substrate base material, for example, the periphery of the black matrix, and the aforementioned $N^+$a-Si films 62 and 62*a*.

While the amorphous silicon TFT element is described as an example of the nonlinear element in this embodiment, the present invention may be also applied to a polysilicon TFT element. A film, which has a higher light-shielding ability than that of the pixel electrode, for constituting the TFT element is formed so that it overlaps with at least the opposite corners of the pixel electrode in a plane manner.

INDUSTRIAL APPLICABILITY

The liquid crystal device of the present invention can be suitably used as a display part of a portable telephone, a display of a portable computer, and the like. The liquid crystal device manufacturing method of the present invention can be utilized as a technique of reducing as many defectives as possible in manufacturing liquid crystal devices. The electronic apparatus of the present invention can be applied in a broad market as consumer and business equipment, such as a portable telephone and a computer.

What is claimed is:

1. A liquid crystal device comprising:
   a wire formed above a first substrate;
   a two-terminal type nonlinear element comprising:
      a first electrode extended from the wire;
      an insulating film formed over the first electrode; and
      a second electrode formed over the insulating film;
      the extending portion of the second electrode formed on at least a portion of the edge of the pixel electrode.

2. The liquid crystal device according to claim 1, outer dimensions of the extending portion of the second electrode being larger than outer dimensions of the pixel electrode.

3. The liquid crystal device according to claim 1, the insulating film being an anodized film.

4. The liquid crystal device according to claim 1, the second electrode being a light-shielding conductive film.

5. An electronic apparatus comprising:
   a liquid crystal device according to claim 1; and
   a control section for controlling the operation of the liquid crystal.

6. A liquid crystal device comprising:
   a wire formed above a first substrate;
   a two-terminal type nonlinear element comprising:
      a first electrode extended from the wire;
      an insulating film formed over the first substrate; and
      a second electrode formed over the insulating film;
   a pixel electrode electrically connected to the second electrode; and
   an edge portion formed under at least a portion of the edge of the pixel electrode, formed of the same film as that of the second electrode, and at least partly framing the pixel electrode.

7. The liquid crystal device according to claim 6, the edge portion being a mark having a higher light-shielding ability than a light-shielding ability of the pixel electrode.

8. The liquid crystal device according to claim 6, the mark being disposed at least at two positions at opposite corners of the pixel electrode, and having two branch portions extending along two sides adjoining the corners.

9. The liquid crystal device according to claim 7, the mark being shaped in a frame formed along the entire peripheral edge of the pixel electrode.

10. The liquid crystal device according to claim 7, further comprising:
    a second substrate opposed to the first substrate;
    a black matrix for divisionally forming an opening portion corresponding to a pixel, and provided with the second substrate; and
    the mark being used to confirm a position with respect to a peripheral edge of the opening portion of the black matrix.

11. An electronic apparatus, comprising:
    a liquid crystal device according to claim 6; and
    a control section for controlling the operation of the liquid crystal.

12. A liquid crystal device, comprising:
    a gate electrode formed above a first substrate;
    a gate insulating film formed over the gate electrode;
    a semiconductor film formed over the gate insulating film;
    a source electrode formed over the semiconductor film via a first conductive film;
    a pixel electrode formed over the semiconductor film via a second conductive film; and
    an edge portion formed along the edge of the pixel electrode, the edge portion electrically connected to and formed of the same film as that of the second conductive film, and the edge portion having a plurality of divided portions which are formed with at least two positions of corners of the pixel electrode.

13. The liquid crystal device of claim 12, the edge portion being a mark having a higher light-shielding ability than light-shielding ability of the pixel electrode.

14. The liquid crystal device of claim 13, the mark being disposed at least at two positions at opposite corners of the pixel electrode, and having two branch portions extending along two sides adjoining the corners.

15. The liquid crystal device of claim 13, further comprising:
    a second substrate opposed to the first substrate;
    a black matrix for divisionally forming an opening portion corresponding to a pixel, and provided with the second substrate; and
    the mark being used to confirm a position with respect to a peripheral edge of the opening portion of the black matrix.

16. An electronic apparatus comprising:
    a liquid crystal device according to claim 12, and
    a control section for controlling the operation of the liquid crystal.

* * * * *